United States Patent
Heylen

(10) Patent No.: US 7,464,411 B2
(45) Date of Patent: Dec. 9, 2008

(54) COPY PROTECTION FOR OPTICAL DISCS

(75) Inventor: Richard A. A. Heylen, Leed (GB)

(73) Assignee: Macrovision Corporation, Santa Clara, CA (US)

( * ) Notice: Subject to any disclaimer, the term of this patent is extended or adjusted under 35 U.S.C. 154(b) by 584 days.

(21) Appl. No.: 09/916,146

(22) Filed: Jul. 26, 2001

(65) Prior Publication Data

US 2002/0076046 A1   Jun. 20, 2002

(30) Foreign Application Priority Data

Jul. 28, 2000  (GB)  ................. 0018577.7
Aug. 14, 2000  (GB)  ................. 0019970.3

(51) Int. Cl.
 *H04K 1/00*  (2006.01)
 *H04N 7/167*  (2006.01)
 *G11B 5/82*  (2006.01)

(52) U.S. Cl. .................. 726/30; 380/203; 360/135
(58) Field of Classification Search ............... 380/201, 380/200, 203; 705/57, 405; 726/30; 360/135
 See application file for complete search history.

(56) References Cited

U.S. PATENT DOCUMENTS

| 4,603,413 A | | 7/1986 | Sinjou et al. |
| 5,659,613 A | | 8/1997 | Copeland et al. |
| 5,699,434 A | * | 12/1997 | Hogan ................. 705/57 |
| 5,703,858 A | | 12/1997 | Mitchell et al. |
| 5,748,119 A | | 5/1998 | Ko |
| 5,787,068 A | | 7/1998 | Arps et al. |
| 5,828,754 A | * | 10/1998 | Hogan ................. 341/69 |
| 5,832,088 A | | 11/1998 | Nakajima et al. |
| 6,028,936 A | | 2/2000 | Hillis |

(Continued)

FOREIGN PATENT DOCUMENTS

EP  0 347 934 A2  12/1989

(Continued)

OTHER PUBLICATIONS

Menezes, Alfred, Handbook of Applied Cryptography, 1997, pp. 20-23.*

(Continued)

*Primary Examiner*—Emmanuel L Moise
*Assistant Examiner*—Michael Pyzocha
(74) *Attorney, Agent, or Firm*—Morrison & Foerster LLP

(57) ABSTRACT

A method of copy protecting optical discs uses the differences in capability between the encoder associated with a laser beam recorder and that in currently available CD writers. Digital sum value (DSV) is a property of the encoded data on CDs and an encoder, which controls a laser beam recorder may be able to choose a pattern of merge bits which result in the overall DSV having optimal properties. During mastering of a CD, data patterns are added to the disc to provide an authenticating signature. These data patterns are chosen to cause DSV problems. Currently available CD writers have been found to have difficulty writing an authenticating signature of the type described without producing a resulting CD which has severe readability problems. Thus, the copy disc written by the CD writer will result in a CD reader returning corrupted data or information signalling a read error.

18 Claims, 5 Drawing Sheets

U.S. PATENT DOCUMENTS

| | | | |
|---|---|---|---|
| 6,076,165 A * | 6/2000 | Maenza | 726/29 |
| 6,278,386 B1 * | 8/2001 | Hogan | 341/58 |
| 6,317,397 B1 * | 11/2001 | Deguchi et al. | 369/47.19 |
| 6,353,890 B1 * | 3/2002 | Newman | 713/193 |
| 6,421,750 B1 | 7/2002 | Gunther et al. | |
| 6,665,240 B1 * | 12/2003 | Kobayashi et al. | 369/47.15 |
| 6,694,023 B1 | 2/2004 | Kim | |
| 6,782,190 B1 * | 8/2004 | Morito | 386/94 |
| 6,839,312 B2 | 1/2005 | Heylen et al. | |
| 6,966,002 B1 | 11/2005 | Torrubia-Saez | |
| 7,030,788 B2 | 4/2006 | Aida et al. | |
| 2001/0011237 A1 * | 8/2001 | Tanaka et al. | 705/27 |
| 2002/0076046 A1 | 6/2002 | Heylen | |
| 2005/0163315 A1 | 7/2005 | Jackson et al. | |
| 2005/0193313 A1 | 9/2005 | Heylen et al. | |
| 2005/0226412 A1 | 10/2005 | Selve et al. | |

FOREIGN PATENT DOCUMENTS

| | | |
|---|---|---|
| EP | 0 347 934 A3 | 12/1989 |
| EP | 0 347 934 B1 | 12/1989 |
| EP | 0 791 923 A2 | 8/1997 |
| EP | 0 854 482 A1 | 7/1998 |
| EP | 0 854 482 B1 | 7/1998 |
| EP | 0918326 | 5/1999 |
| EP | 1011103 A1 | 6/2000 |
| EP | 1355306 A1 | 10/2003 |
| EP | 1 396 857 A1 | 3/2004 |
| EP | 1418584 A1 | 5/2004 |
| EP | 1 494 235 A1 | 1/2005 |
| EP | 1505598 A1 | 2/2005 |
| EP | 1521262 A1 | 4/2005 |
| GB | 2397687 A | 7/2004 |
| GB | 2 369 718 B | 8/2004 |
| JP | 2002-175662 A | 6/2002 |
| WO | WO-98/02885 A1 | 1/1998 |
| WO | WO-98/54713 A1 | 12/1998 |
| WO | WO-98/57413 A1 | 12/1998 |
| WO | WO-00/74053 A1 | 12/2000 |
| WO | WO-02/11136 A1 | 2/2002 |
| WO | WO-03/085668 A1 | 10/2003 |
| WO | WO-2004/066294 A1 | 8/2004 |
| WO | WO-2004/075185 A1 | 9/2004 |
| WO | WO-2004/075186 A2 | 9/2004 |

OTHER PUBLICATIONS

Menezes, Alfred et al. "Handbook of Applied Cryptography," CRC Press LLC 1997, p. 275.*

Kalker, T. (Jun. 7, 1999). "System Issues in Digital Image and Video Watermarking for Copy Protection," Multimedia Computing and Systems 1999, IEEE International Conference in Florence, Italy on Jun. 7-11, 1999, Los Alamitos, CA, *USA IEEE Comput.Soc.*, pp. 562-567.

Schouhamer Immink, K.A. (Aug. 1, 1995). "EFMPlus: The Coding Format of the Multimedia Compact Disc", *IEEE Transactions on Consumer Electronics*, IEEE Inc., New York, US, 41(3):491-497.

European Search Report dated Feb. 25, 2005 for EP patent application No. 05 00 0302, 2 pages.

GB Examination Report for GB Application No. 0401496.5 dated May 19, 2005, one page.

GB Examination Report for GB Application No. 0403721.4 dated Jun. 9, 2005, one page.

International Search Report mailed on Oct. 10, 2001 for PCT Application No. PCT/GB01/03364 filed on Jul. 26, 2001, two pages.

* cited by examiner

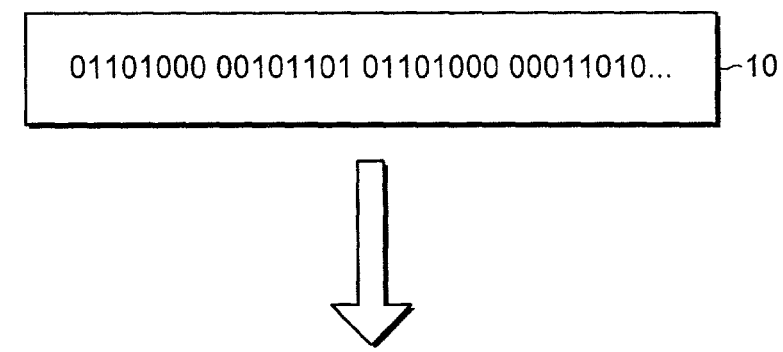

COPY PROTECTION FOR OPTICAL DISCS

BACKGROUND TO THE INVENTION

The present invention relates to a method of copy protecting optical discs, and to optical discs when so protected. The invention also extends to a method of preventing the mastering of optical discs by non-enabled encoders.

Optical discs, such as the various formats of compact discs (CDs), and of digital versatile discs (DVDs) are increasingly used for carrying information for many different applications. The information encoded onto the optical discs is generally very valuable, and accordingly, they are increasingly copied by counterfeiters. Furthermore, recordable CDs are now available and CD writers for writing the information content from one disc to such recordable discs are now readily available to the domestic consumer. This means that new and effective methods for copy protecting the optical discs are required.

There is described, for example, in WO98/57413 a method of providing an optical disc with an authenticating signature. This authenticating signature is arranged so that it is not, or cannot be, copied by available machines for reading and writing data from CDs. For example, in WO98/57413, a sector of a CD is provided with a pattern of errors which cannot be corrected by the error correcting rules and thereby constitutes an uncorrectable sector or "bad sector" on the disc. The existence of the expected bad sector is taken as an authenticating signature and is used to identify a genuine disc.

SUMMARY OF THE INVENTION

The present invention seeks to provide a method of copy protecting optical discs by employing an authenticating signature. An authenticating signature of the present invention may be used alone, or may be used with a bad sector signature as described, for example, in WO98/54713, or with other authenticating signatures or with other copy protection means.

According to a first aspect of the present invention there is provided a method of copy protecting optical discs, the method comprising using an authenticating signature made up of data patterns arranged such that the signature cannot generally be accurately written onto a disc by a writer for recordable discs, the method comprising adding the authenticating signature onto an optical disc during its mastering process.

The present invention utilises the inherent limitations of currently available CD writers. Thus, the applicants have found that it is possible to provide an authenticating signature on a disc which, because of its size and/or its nature, cannot be accurately written onto a disc by a writer for recordable discs such that it is reliably readable. However, the much more sophisticated encoders used in mastering houses, for example, the encoder which controls a laser beam recorder, can be controlled to accurately write the authenticating signature to the glass master.

The encoder associated with a laser beam recorder has a relatively large amount of memory and processing power at its disposal. Specifically, the encoder uses sophisticated algorithms to analyse the data and authenticating signature which are to be written to the disc. The purpose of these algorithms is to ensure that this data and authenticating signature are encoded onto the glass master in a manner which ensures that the data and authenticating signature on the discs produced using this glass master can be read correctly by all CD readers. The encoder chooses the merge bits which are interspersed in the encoded data and authenticating signature as part of the encoding process and the chosen merge bit pattern ensures the readability of the replica discs made from the glass master. These sophisticated encoders can compromise the readability of one area of disc slightly, to ensure the readability of another area of disc, the overall effect being to ensure that the whole disc has a uniformly high readability.

By contrast, commercially available CD writers are limited in the processing power and memory which can be brought to bear on the problem of encoding the data. Specifically, the encoder built into a CD writing device contains simpler encoding algorithms because complicated algorithms require more processing power, more memory and they are more expensive to design, write and debug which reduces the profit margin on the writer. These simpler decoding algorithms may not make the ideal choices for merge bits even when the better choices are readily available. If one area of disc is easy to encode so as to ensure high readability and the following region is difficult to encode and would have a low readability, the simple encoders in CD writers do not have the foresight to trade-off the readability of one area with another and the result is that the easily encoded region is encoded well and the region which is difficult to encode is encoded badly and when the disc is read, errors are found in this latter region.

It would, of course, be possible to provide special or customised encoders to apply the authenticating signature to the optical disc. However, the applicants have found that they can add the authenticating signature without the need for any special equipment. A method of the invention comprehends the use of existing, customised and/or special encoders.

A copy protection method of an embodiment of the invention may simply require that the existence of corrupted or otherwise incorrect data in a particular sector on an optical disc be used to signify that that disc is not original whereby its use may be prevented.

However, in a preferred embodiment, successful operation of a disc requires that the disc be present in the drive and that a correct signature be readable therefrom.

In a presently preferred embodiment, the data patterns of the authenticating signature are chosen to cause digital sum value (DSV) problems for CD writers. Thus, it is required that the data patterns can be encoded and written to a glass master by a laser beam recorder with good readability, but that recording the patterns using a CD writer produces an encoding which would have DSV problems, and hence cause data errors on a CD-R produced by the CD writer. When the data patterns on the CD-R are subsequently read by a drive for CDs and other optical discs, the DSV can accumulate or decrement, and the resultant DSV can cause problems for the drive. Thus, the adverse DSV characteristics may cause the drive to report errors and/or fail to return the correct information.

It will be appreciated that it is generally required to encode data onto a disc such that the DSV has as low a magnitude as possible. In an embodiment, the data patterns are chosen to ensure that the DSV has a significant absolute value, that is, has an absolute magnitude which is significantly greater than would be usual.

In one embodiment, the data patterns which are chosen to cause DSV problems are repeated patterns of values. It is additionally and/or alternatively possible to calculate the values to ensure that CD writers will encounter DSV problems.

Additionally and/or alternatively, the size of the data patterns causing the DSV problems may be a predetermined amount, for example, in excess of 270,000 bytes.

Additionally, and/or alternatively, the data patterns which are chosen to cause DSV problems are arranged to have a DSV which has a rapid rate of change.

In this respect, it is currently thought that it is the rate of change of DSV, rather than the absolute values thereof, which are most effective in causing the DSV problems.

Additionally, and/or alternatively, the data patterns which are chosen to cause DSV problems are arranged to produce a DSV which has a substantial low frequency component.

It will be appreciated that a CD writer will generally be unable to accurately write the chosen data patterns of the authenticating signature to a copy disc. However, it is required that normally available CD drives can play or read original discs with the authenticating signature without any problems. In this respect, it has been found that most drives able to play or read CDs can play or read original discs without difficulty, and it is thought that the choice of merge bits made by the encoder used is capable of reducing the risk of DSV problems during the reading of original discs.

In accordance with an embodiment of a method of the invention, the authenticating signature is also made up of sectors containing only zeros which are provided both before and after sectors containing the chosen data patterns.

It will be appreciated that, in the main, the sectors of zeros will be taken together with the sectors of the data patterns during reading of the disc whereby the encoder used in the mastering process is given time to make an optimum choice of the merge bits. These padding areas of zeros can also facilitate normal play of an original optical disc.

The present invention also extends to a copy-protected optical disc having an authenticating signature which has been applied thereto during mastering, wherein the authenticating signature is made up of data patterns arranged such that the signature cannot generally be accurately written onto a disc by a writer for recordable discs.

The authenticating signature is added to an optical disc during its mastering process and the data patterns thereof have a size and/or a nature which ensures that they cannot be accurately written by a CD writer.

According to a further aspect of the present invention there is provided an optical disc having data patterns thereon which have been chosen to cause DSV problems for CD writers.

Specifically, the data patterns on the optical disc, which may be used as a blocking file or an authenticating signature, cannot be accurately written by a CD writer.

It is required that the data patterns can be encoded and written to a glass master by an encoder for a laser beam recorder with good readability, but that recording the patterns using a CD writer produces an encoding which would have DSV problems, and hence cause data errors on a CD-R produced by the CD writer.

It will be appreciated that it is generally required to encode data onto a disc such that the DSV has as low a magnitude as possible. In an embodiment, the data patterns are chosen to ensure that the DSV has a significant absolute value, that is, has an absolute magnitude which is significantly greater than would be usual.

In one embodiment, the data patterns which are chosen to cause DSV problems are repeated patterns of values. It is additionally and/or alternatively possible to calculate the values to ensure that CD writers will encounter DSV problems.

Additionally and/or alternatively, the size of the data patterns causing the DSV problems may be a predetermined amount, for example, in excess of 270,000 bytes.

Additionally, and/or alternatively, the data patterns which are chosen to cause DSV problems are arranged to have a DSV which has a rapid rate of change.

In this respect, it is currently thought that it is the rate of change of DSV, rather than the absolute values thereof, which are most effective in causing the DSV problems.

Additionally, and/or alternatively, the data patterns which are chosen to cause DSV problems are arranged to produce a DSV which has a substantial low frequency component.

It will be appreciated that conventional methods for encoding data onto optical discs are specifically designed to reduce the likelihood that data patterns will be applied to the discs which will provide DSV problems.

It would, of course, be possible to provide special or customised encoders to apply the authenticating signature described to an optical disc. However, the applicants have found that they can add the authenticating signature without the need for any special equipment. The present invention clearly covers the use of existing, customised, and/or special encoders.

In embodiments of the invention, the data patterns of the authenticating signature have been applied to an optical disc during its mastering process. Specifically, the data patterns are chosen to cause digital sum value (DSV) problems, and are scrambled using the Exclusive Or (XOR) algorithm which is to be used in the mastering process, the mastering process then comprises the steps of applying the scrambled data patterns to the optical disc such that the scrambled data patterns are themselves scrambled using the XOR algorithm whereby the scrambling process outputs the chosen data patterns for application to the optical disc.

In a presently preferred embodiment, the chosen data patterns are repeated patterns of values which are known to cause DSV problems. Of course, the traditional encoding process for the data applied to optical discs also interleaves data such that the repeated patterns of values would conventionally be distributed across several sectors.

In accordance with a preferred embodiment of the present invention, the chosen data patterns are copied to a plurality of sectors, for example, to three or more sectors on the optical disc.

According to a further aspect of the present invention there is provided a method of authenticating a copy protected optical disc having an authenticating signature, the method comprising the steps of requiring a disc drive to locate and accurately read the authenticating signature on the disc in order to enable operation of the disc, wherein the authenticating signature is made up of data patterns arranged such that the signature cannot generally be accurately written onto a disc by a writer for recordable discs.

The authenticating signature on the copy protected disc is preferably of data patterns chosen to cause DSV problems as set out above. The data patterns of the authenticating signature may have any, or any combination of the characteristics defined above.

The copy protected disc to be authenticated by the method defined may have any, or any combination of, the features defined above.

The invention also extends to a method of enabling the mastering of an optical disc by an enabled encoder, where a recordable disc, from which a drive associated with the encoder is to read data during the mastering process, carries a blocking file made up of data patterns which cannot generally be accurately read by a disc drive, the method comprising the step of providing on the recordable disc information as to the existence and location of the blocking file, the drive associated with the encoder being arranged not to read the blocking fire in response to said existence and location information.

In accordance with a still further aspect of the present invention, there is provided a recordable disc for use in a process for mastering optical discs, wherein the recordable disc carries the data to be carried on the optical discs, wherein the recordable disc carries a blocking file made up of data patterns added to a recordable disc during the authoring or premastering process, and wherein the data patterns cannot generally be accurately read by a disc drive.

In a presently preferred embodiment, the data patterns of the blocking file are chosen to cause digital sum value (DSV) problems, For example, the data patterns have a DSV which has a significant absolute value.

In one embodiment, the data patterns which are chosen to cause DSV problems are repeated patterns of values, It is additionally and/or alternatively possible to have values calculated to provide the DSV required.

Additionally and/or alternatively, the size of the data patterns producing the required DSV may be a predetermined amount, for example, in excess of 270,000 bytes.

Additionally, and/or alternatively, the data patterns which are chosen to cause DSV problems are arranged to have a DSV which has a rapid rate of change.

Additionally, and/or alternatively, the data patterns which are chosen to cause DSV problems are arranged to produce a DSV which has a substantial low frequency component.

It will be appreciated that conventional methods for encoding data onto discs are specifically designed to reduce the likelihood that data patterns will be applied to the discs which will provide DSV problems.

It would, of course, be possible to provide special or customised encoders to apply the blocking file described to the recordable disc. However, the applicants have found that they can add the blocking file without the need for any special equipment.

In embodiments of the invention, the data patterns of the blocking file have been applied to a recordable disc during its premastering process. Specifically, the data patterns are chosen to cause digital sum value (DSV) problems, and are scrambled using the Exclusive Or (XOR) algorithm which is to be used in the premastering process, the premastering process then comprises the steps of applying the scrambled data patterns to the disc such that the scrambled data patterns are themselves scrambled using the XOR algorithm whereby the scrambling process outputs the chosen data patterns for application to the recordable disc.

BRIEF DESCRIPTION OF THE DRAWINGS

Embodiments of the present invention will hereinafter be described, by way of example, with reference to the accompanying drawings, in which:

FIGS. 7a and 7b illustrate an example of data patterns used in copy protection methods of the invention.

DESCRIPTION OF EMBODIMENTS OF THE INVENTION

In the description which follows, the invention is described specifically by reference to the encoding of a CD-ROM and hence with reference to the use of the present invention for copy protecting such a CD-ROM. However, it will be appreciated that the present invention is not limited to use with a CD-ROM and finds application to all data carrying optical discs. Specifically, the invention is applicable to all formats of CDs and to all formats of DVDs.

Furthermore, the description which follows gives one example of the encoding of data onto a CD. Other encoding modes are possible and it will be appreciated that the invention is not limited to the encoding mode.

Figure 1:
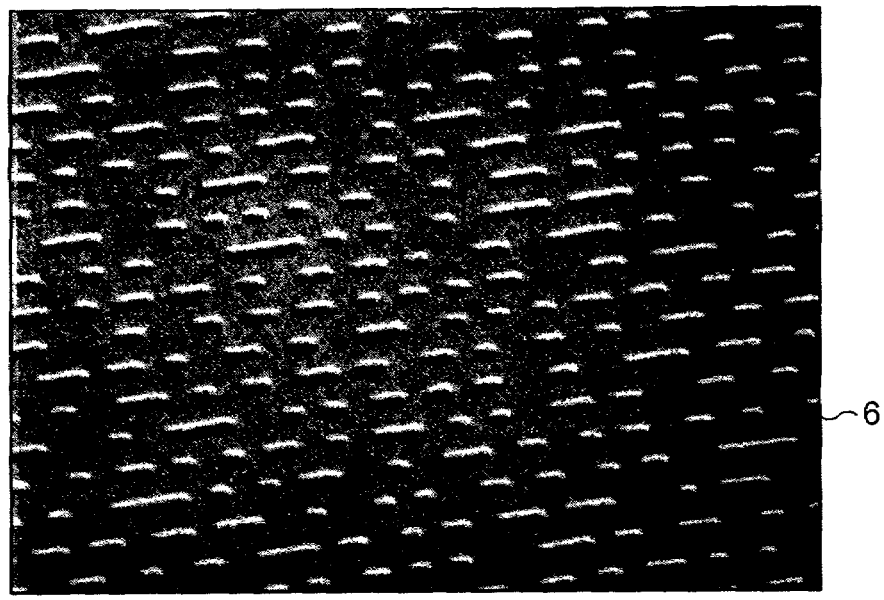
FIG. 1 shows the surface of a compact disc, very much enlarged, showing the pits thereon.

FIG. 1 shows an enlarged view of part of a CD showing the pits 6 thereon. As is well known, these pits extend along a spiral track on the surface of the disc and are separated by lands.

Figure 2:
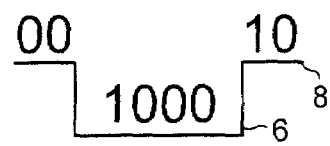
FIG. 2 shows a cross section of a pit illustrating the data associated therewith.

FIG. 2 shows a section through a pit 6 and land 8 illustrating how data is encoded on a CD. The pits and lands do not represent binary 0s and 1s, but instead represent transitions from one state to another. The data signal is stored in NRZI form (Non-Return to Zero inverted), where the signal is inverted every time a 1 is encountered. FIG. 2 shows the binary value 00100010.

The data stream always consists of pits and lands of at least 3 bits and at most 11 bits long. This is sometimes referred to as a 3T-11T where T is a 1 bit period. A 3T pit has the highest signal frequency (720 khz) and an 11T pit has the lowest signal frequency (196 khz).

A data signal is derived from the lengths of the pits and lands. The produced signal forms a square wave known as an EFM signal, The digital sum value (DSV) is the running difference between the number of T values where the EFM represents a pit and the number of T values where the EFM represents a land. As each data bit is read, the DSV is incremented or decremented depending upon whether the data bit corresponds to a pit or a land.

Figure 3:
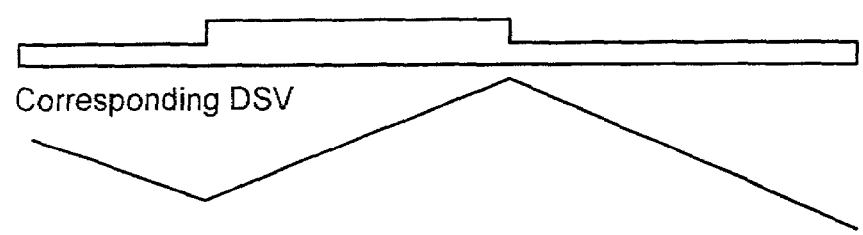
FIG. 3 shows the DSV associated with the pits and lands illustrated.

As is indicated in FIG. 3, the DSV is determined by assigning the value +1 to each land T, and −1 to each pit T. Ideally, the DSV should stray as little as possible from the zero level. If the DSV has a rapid rate of change over a significant period of time or if the DSV has substantial low frequency components then the transitions in the EFM signal may be shifted from their ideal values and/or the ability of tracking and focus circuits in CD drives to maintain optimal head positioning may be compromised. This typically causes read failures from the CD.

Original data, in 8 bit bytes, is passed through a process called EFM encoding to produce the 14 bit symbols. The set of 14 bit symbols is especially designed:

to level out the number of pits and lands, to help maintain balanced DSV; and to ensure that there are no symbols which break the EFM coding scheme of 3T-11T.

However, it is still possible to have two 14 bit symbols, which when joined together would compromise the coding scheme. Accordingly, a set of 3 merge bits are added between each 14 bit symbol to ensure that there are no violations of the 3T-11T coding scheme and to ensure that a suitable DSV is maintained.

The merge bits contain no useful data and the algorithm used to generate their values can differ from drive to drive. Once read, the merge bits are discarded and the data contained in the 14 bit symbol is passed onto the next process.

The above describes the basic encoding scheme for a CD and will be known to those skilled in the art. Accordingly, further explanation thereof is not required.

As set out above, embodiments of this invention utilise the inherent limitations of currently available CD writers, and in particular the differences in capability between the encoder associated with a laser beam recorder and that in a CD writer.

The encoding of a CD is subject to two rigorous conditions and one more vague requirement. The first strict rule is that the encoded data must decode without errors in the data which the author wanted on the disc. The second strict rule is that the encoding must obey the run-length limiting rules so that no pits or lands are longer than 11T or shorter than 3T. The vague requirement is that the DSV characteristics of the disc should be as good as possible.

As set out above, DSV is a property of the encoded data. It is a running difference between the number of pit T states and the number of land T states. It is desirable that the DSV should not have high absolute values, should not change rapidly, and should not have low frequency components. This latter requirement means that the DSV should not oscillate in a regular fashion.

In order to maintain good DSV characteristics, the encoder often has a choice in the merge bits to insert between the symbols which carry the data. When encoding certain special patterns of data, the encoder has a very much reduced ability to choose merge bits because the run-length limiting rules place limitations on the merge bits which can precede or follow certain symbols. The encoder effectively loses much of its control of the DSV while this data is being encoded. It is critical that it chooses correctly in the few locations where it has a choice.

A sophisticated encoder, such as those which control laser beam recorders, may have the foresight, or can be designed, to choose a pattern of merge bits which is not optimal for the immediate locality where this area is followed by one in which the run length limiting rules dictate the merge bits, The result will be that the overall DSV for the two areas will have better properties. The ability to detect upcoming areas where the merge bit choices are limited is called "look-ahead". Encoders with a larger look-ahead will be able to make more preparations for encoding the troublesome data and hence the overall encoding will be better. CD writers typically have very little ability to look ahead and hence when they lose control of the DSV, it is more likely to result in an unreadable disc.

The applicants have identified a number of values which are capable of causing DSV problems because of their EFM pattern at the pits and lands level. When the patterns for these values are processed through the EFM decoder of a CD drive, the DSV accumulates or decrements and this can result in read failures. Of course, and as indicated above, the encoding process for a CD is designed to prevent values capable of causing DSV problems occurring in the EFM pattern as well as providing robust error correction.

Figure 4:
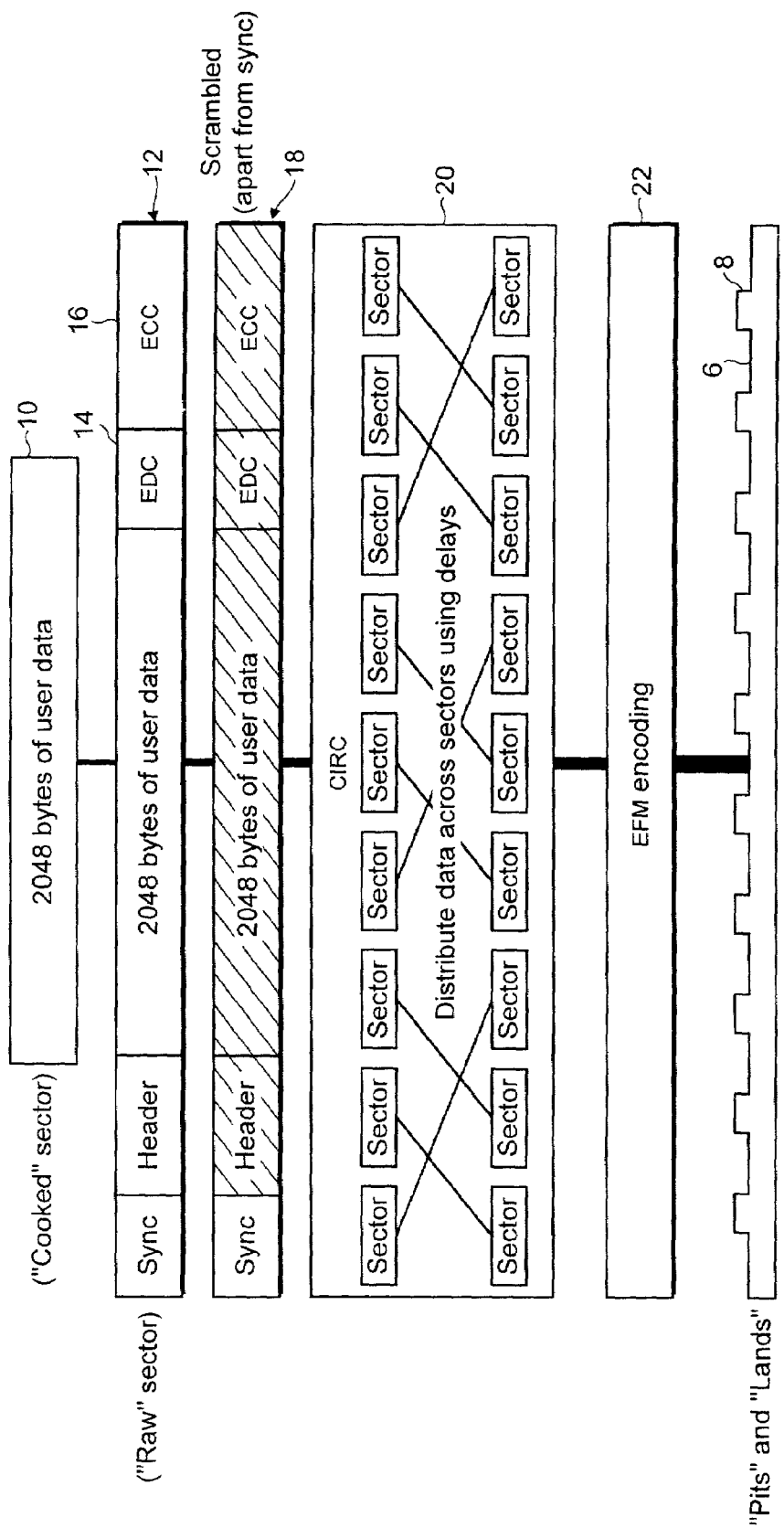
FIG. 4 shows schematically a process for encoding data onto a CD.

FIG. 4 shows schematically the encoding of data onto a CD in the form of pits 6 and lands 8. Initially, and as indicated, there are 2048 bytes of user data. This is indicated at 10. Then, as illustrated at 12, a sync block, a header, an error detection code (EDC) 14 and error correction code (ECC) 16 are added to those original 2048 bytes.

To help ensure that the final arrangement of pits and lands meet the EFM coding rules for DSV, the data at 12 is then scrambled as shown at 18 using an XOR algorithm. The scrambling seeks to reduce the likelihood that plausible repeating patterns of user data would inadvertently correspond to DSV problem causing patterns by effectively randomising the data across a sector.

As indicated at 20, the data is then passed to the CIRC encoder. The CIRC encoder, by means of delays, distributes the data across a number of sectors. The data is then passed to the EFM encoder 22 where it is converted into the pattern of 1's and 0's. It is the EFM encoded data, which now incorporates the merge bits, which is converted into the series of pits and lands on the disc.

Clearly, the scrambling is provided to create a pattern of values that do not cause DSV problems. It is therefore necessary to overcome the effects of those processes in order to apply to the disc values which are known to cause DSV problems.

The data patterns intended to provide an authenticating signature are XOR'd with the same pattern of scrambling data as is used in the scrambling process indicated at 18. This scrambled data is then subjected to the process indicated in FIG. 4. It will be appreciated that when the scrambled data is subjected to the XOR algorithm on encoding, each byte from the sector will be returned to its original value.

The mixing effect of the CIRC encoder, which is indicated at 20, can be partially overcome by writing multiple copies of the sector. For example, sectors N+1, N+2, N+3 and N+4 will contain the same user data as sector N.

To provide an authenticating signature for a CD, data patterns are chosen which are known to cause DSV problems. For example, and as described above, the data patterns may include sectors filled with repeated values. The glass master is created to have the authenticating signature on it by overcoming the effects of the XOR scrambling and the CIRC encoding as described above.

Figure 5:
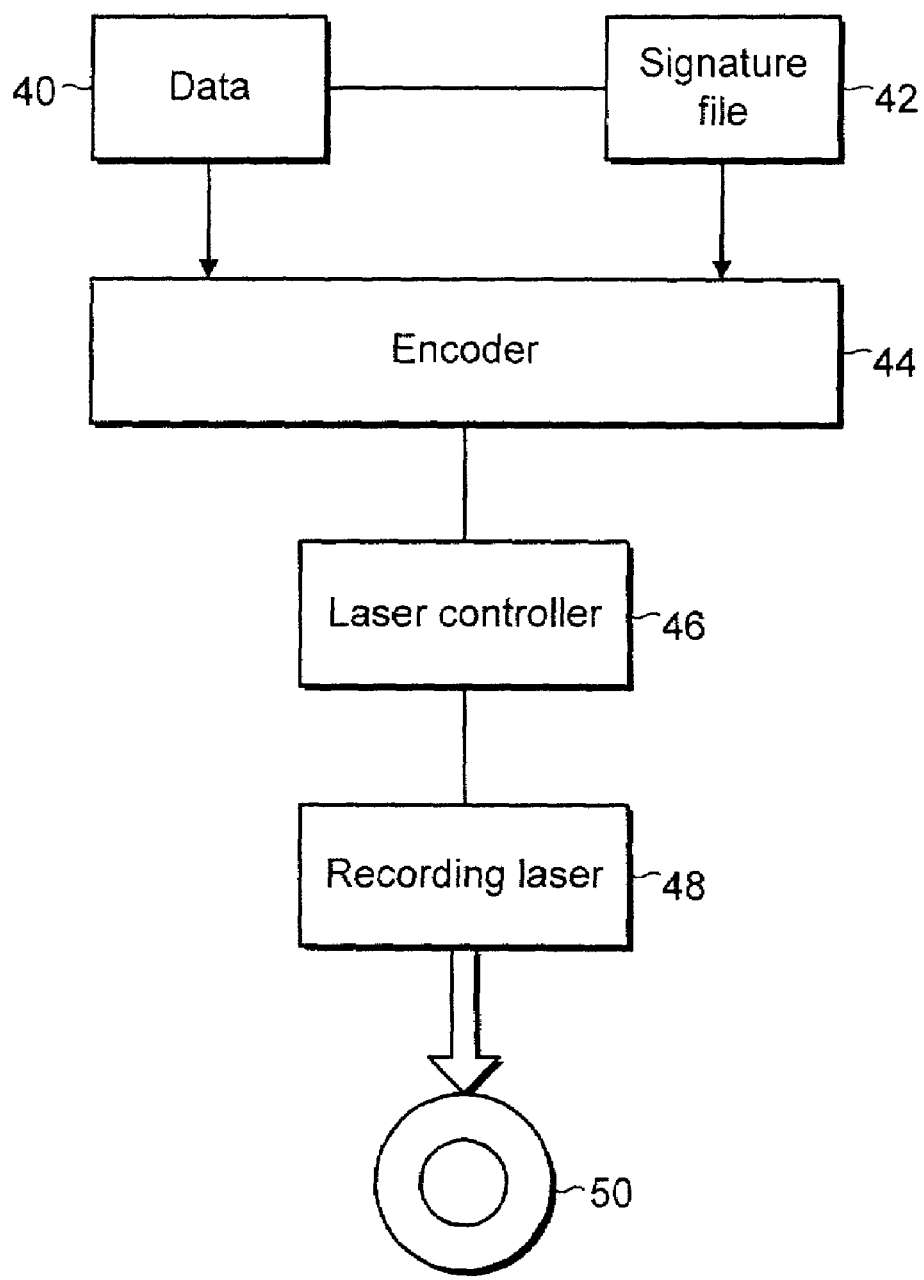
FIG. 5 shows schematically a mastering process for a CD in which an authenticating signature is added to the disc.

In this respect, and as indicated in FIG. 5, during the mastering process, data 40 for the glass master and data 42 for the authenticating signature are provided to an encoder 44 associated with a laser beam controller 46. The controller 46 operates the recording laser 48 to write the data to a glass master 50. The data 40 and the data 42 may be provided on respective CD-Rs, or on the same CD-R, for example. Preferably, at least the data patterns of the authenticating signature are encrypted on the recordable CD so as to be readable. The data patterns are decrypted by the encoder 44, and are then subjected to scrambling and CIRC encoding, as described. The encoder 44 writes the authenticating signature accurately to the glass master 50. As set out above, it is the encoder 44 which chooses the merge bits to ensure that suitable DSV characteristics are maintained, and the encoder associated with a laser beam recorder is generally able, or can be arranged, to make a choice of merge bits which ensure the readability of the resultant replica discs made from the glass master. These original replica CDs are replicated from the glass master in conventional manner.

Pre and post padding areas consisting of blank sectors may also be added to the recordable disc around the authenticating signature. These may be helpful to the encoder used in the mastering process in providing time which the encoder can use to make an optimum choice of merge bits. In addition, the use of padding areas of blank sectors also increases the combinations of authenticating signature available. In presently preferred embodiments, for example, an authenticating signature may comprise several sectors having repeated values interspersed by padding areas.

FIGS. 7a and 7b illustrate schematically one example of data patterns which can be used in methods of the invention. Specifically, FIG. 7a shows the first four bytes only of a 2048 byte block 10 of user data. This data is changed, as described above, to cause DSV problems, and FIG. 7b shows the first four bytes only of a 2048 byte data pattern 10' resulting from the changes to the user data 10.

As set out above, it has been found that the encoders of currently available CD writers are not able to accurately write such an authenticating signature to a copied disc. On the copied disc for example, the authenticating signature may be corrupted or unreadable.

Figure 6:
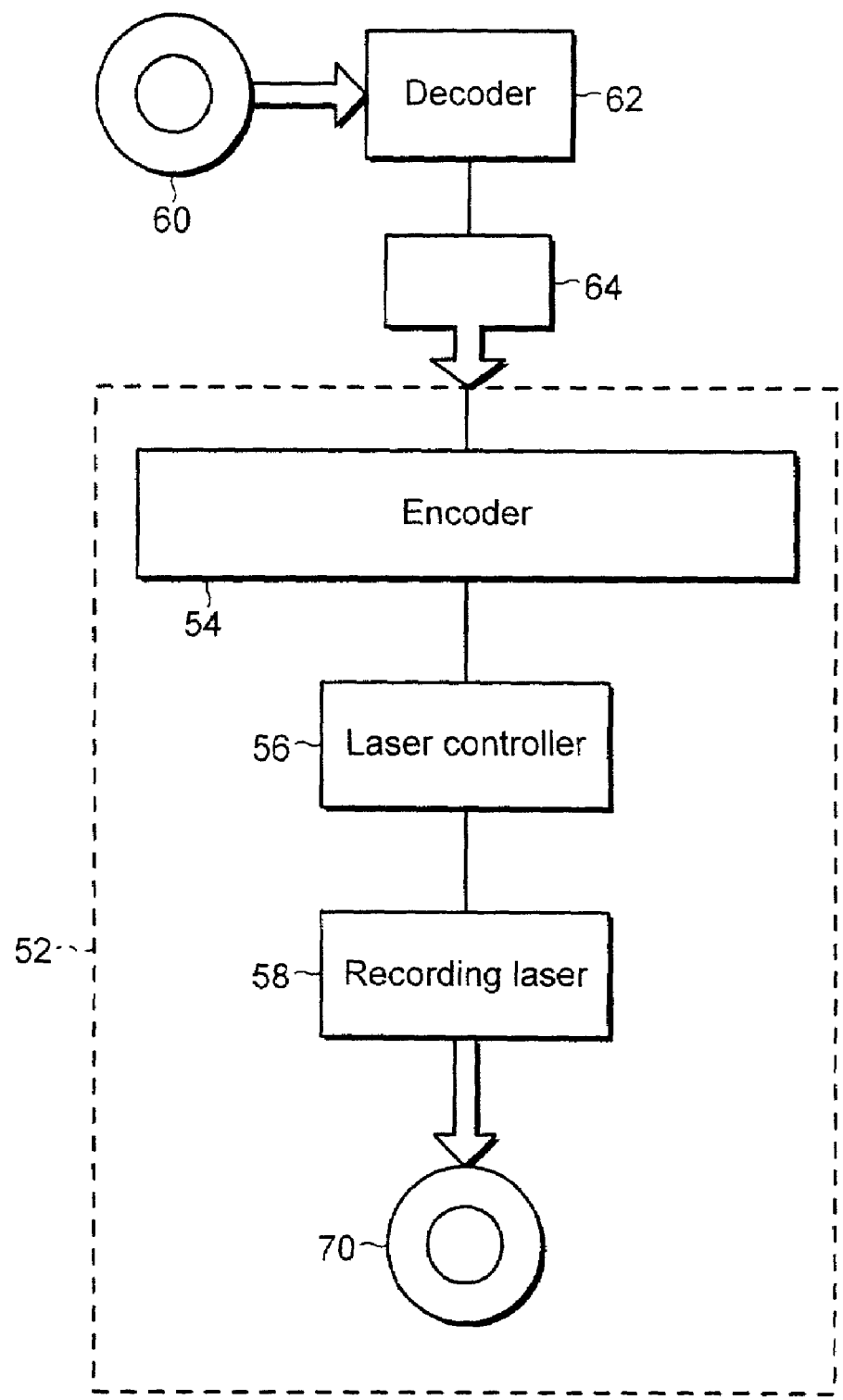
FIG. 6 shows schematically the reading of an original disc and the writing of a copy disc by a CD writer.

When a CD writer, as 52 in FIG. 6, is used to make a copy of an original disc 60 with the authenticating signature, it is provided with the user data from the original disc by a drive incorporating, for example, a decoder 62 and an output 64. The user data decoded from the original disc 60 will not include the information about the pattern of merge bits as these are decoded by the decoder 62. The decoded data is input to the CD writer 52 where it is encoded by encoder 54 and then written to a CD-R 70 by way of the recording laser 58 and its controller 56. Although the process used by the CD writer looks the same as that used to produce the glass master 50, as set out above, currently available CD writers are found to have difficulty writing an authenticating signature of the type described without producing a resulting CD 70 which has severe readability problems. Accordingly, a CD writer will write a disc which, when read will result in the CD reader returning corrupted data or information signalling a read error.

The effect of the data copied onto a copy disc, as 70, will vary from drive to drive. Thus, the corrupted or unreadable authenticating signature on the copied disc may cause read failures and this may be used alone to provide copy protection for an original disc.

However, it is presently preferred that the authenticating signature is used to enable the play of an original disc. In this respect, it is required that the original disc has to remain in the drive. When data from the disc is to be used, software carried by the disc requires the drive to locate and read the authenticating signature and enables play of the disc only when that authenticating signature agrees with the rendition thereof in the software.

The techniques as described herein may also be adapted to control the encoders which are able to make glass masters from the contents of a recordable CD. In this respect, a recordable CD is premastered to carry the publisher's data 40 and it may also carry authenticating instructions. However, an authenticating signature 42, for example, as described in WO98/54713 for use with those authenticating instructions is generally only added during mastering and it is important, therefore, that encoders which do not add the authenticating signature are prevented from making a glass master.

To prevent the use of a non-enabled encoder in mastering, data patterns as described are added to the recordable CD carrying the data 40 and, in addition, information as to the existence and location of the data patterns is provided in the primary volume descriptor of the recordable CD, However, in this case, the nature and/or size of the data patterns is chosen to ensure that DSV problems are caused when the recordable CD is read such that the data patterns define a blocking file.

An enabled encoder, as 44, is arranged to decode the information in the primary volume descriptor and, as a result, does not attempt to read the blocking file during the mastering process. On the glass master, 50, the enabled encoder 44 will write sectors of zero's to replace the sectors which contained the blocking file. However, a non-enabled encoder processes the blocking file along with the rest of the data on the recordable CD. When the recordable CD is read in preparation for the commencement of writing the glass master, the DSV problems caused by the existence of the blocking file will cause the CD reader to signal a read error. This will prevent the mastering process on a nonenabled encoder.

It will be appreciated that variations in, and modifications to the embodiments as described and illustrated may be made within the scope of this application.

The invention claimed is:

1. A method of copy protecting an optical disk comprising:
providing data patterns such that the data patterns cannot be accurately copied onto another disc by a writer for recordable discs which has a limited ability to look ahead during encoding, wherein the data patterns have a DSV (digital sum value) which has a rapid rate of change over time;
the data patterns making up an authenticating signature;
subjecting the data patterns to a first exclusive Or (XOR) scrambling algorithm;
applying the scrambled data patterns of the authenticating signature and other data to the optical disc in a mastering process, the mastering process including:
using a laser beam recorder controlled by an encoder which has a larger ability to look ahead than the writer;
encoding the scrambled data patterns using EFM (eight to fourteen modulation) with a second XOR scrambling algorithm having the same pattern of scrambling data as the first XOR scrambling algorithm; and
applying the twice scrambled data patterns and the other data to the optical disk;
wherein transitions in the EFM signal from the applied data patterns are shifted from their ideal values, or the ability of disc drives to maintain optimal beam positioning is compromised, by the twice scrambled data patterns.

2. A method according to claim 1, wherein the existence of corrupted or otherwise incorrect data in a particular sector on the optical disc signifies that that disc is not original whereby its use may be prevented.

3. A method according to claim 1, wherein successful operation of the copy protected disc requires that the disc be present in the drive and that a correct authenticating signature be readable therefrom.

4. A method according to claim 1, wherein the provided data patterns additionally to the rapid rate of change ensure that the DSV has an absolute value significantly greater than usual.

5. A method according to claim 1, wherein the provided data patterns are repeated patterns of values.

6. A method according to claim 1, wherein the size of the provided data patterns is predetermined.

7. A method according to claim 1, wherein the provided data patterns are arranged to produce a DSV which has a substantial low frequency component lower than that of the lowest signal frequency that does not cause DSV problems.

8. A method according to claim 1, wherein the authenticating signature is also made up of sectors containing only zeros which are provided both before and after sectors containing the data patterns.

9. An optical disc copy protected according to the method of claim 1.

10. A method according to claim 1, wherein the provided data patterns have a size and/or a nature which ensures that they cannot be accurately written by a writer of recordable discs.

11. A method according to claim 1, wherein the data patterns are put in a plurality of sectors on the optical disc.

12. An optical disc carrying a plurality of pits and lands in its surface, each defining a state transition and thereby defining data, the data comprising:
data patterns, the data patterns being originally such that the data patterns cannot be accurately copied onto another disc by a writer for recordable discs which has a limited ability to look ahead during encoding, wherein the original data patterns have a DSV (digital sum value) which has a rapid rate of change;

the data patterns making up an authenticating signature;

wherein the original data patterns having been subjected to an exclusive Or (XOR) scrambling algorithm;

the scrambled data patterns of the authenticating signature and other data having been applied to the optical disc in a mastering process, wherein the mastering process includes using a laser beam recorder controlled by an encoder which has a larger ability to look ahead than the writer;

the scrambled data patterns having been encoded using EFM (eight to fourteen modulation) with a second XOR scrambling algorithm having the same pattern of scrambling data as the first XOR scrambling algorithm; and the twice scrambled data patterns and other data having been applied to the optical disk;

wherein transitions in the EFM signal from the applied data patterns are shifted from their ideal values, or the ability of disc drives to maintain optimal head positioning is compromised by the twice scrambled data patterns.

13. A copy protected optical disc according to claim 12, wherein the provided data patterns have a size and/or a nature which ensures that they cannot be accurately written by a writer of recordable discs.

14. A copy protected optical disc according to claim 12, wherein the provided data patterns additionally to the rapid rate of change ensure that the DSV has an absolute value significantly greater than usual.

15. A copy protected optical disc according to claim 12, wherein the provided data patterns are repeated patterns of values.

16. A copy Protected optical disc according to claim 12, wherein the size of the provided data patterns is predetermined.

17. A copy protected optical disc according to claim 12, wherein the provided data patterns are arranged to produce a DSV which has a substantial low frequency component lower than that of the lowest signal frequency that does not cause DSV problems.

18. A copy protected optical disc according to claim 12, wherein the data patterns are put in a plurality of sectors on the optical disc.

* * * * *